United States Patent
Feng et al.

(10) Patent No.: US 9,178,871 B2
(45) Date of Patent: Nov. 3, 2015

(54) AUTHENTICATION AND AUTHORIZATION METHOD AND SYSTEM

(71) Applicants: Delta Networks (Xiamen) LTD., Xiamen, Fujian (CN); Delta Networks, Inc., Taoyuan County (TW)

(72) Inventors: Hong-Yan Feng, Taoyuan Hsien (TW); Min Lu, Taoyuan Hsien (TW); Bin Zhao, Taoyuan Hsien (TW)

(73) Assignees: DELTA NETWORKS (XIAMEN) LTD, Xiamen, Fujian (CN); DELTA NETWORKS, INC, Taoyuan (TW)

( * ) Notice: Subject to any disclaimer, the term of this patent is extended or adjusted under 35 U.S.C. 154(b) by 0 days.

(21) Appl. No.: 14/166,051

(22) Filed: Jan. 28, 2014

(65) Prior Publication Data

US 2014/0223518 A1  Aug. 7, 2014

(30) Foreign Application Priority Data

Feb. 4, 2013 (TW) .............................. 102104151 A (51) Int. Cl.
*H04L 9/32* (2006.01)
*H04L 29/06* (2006.01)

(52) U.S. Cl.
CPC ........ *H04L 63/0823* (2013.01); *H04L 63/0892* (2013.01)

(58) Field of Classification Search
CPC .................................................... H04L 61/203
See application file for complete search history.

(56) References Cited

U.S. PATENT DOCUMENTS

| 8,646,060 | B1 * | 2/2014 | Ben Ayed | ........... H04L 63/0853 726/9 |
| 8,769,643 | B1 * | 7/2014 | Ben Ayed | ............ H04W 12/06 726/5 |
| 2010/0217980 | A1 * | 8/2010 | Komorita et al. | ............. 713/168 |
| 2011/0072512 | A1 * | 3/2011 | Je et al. | ............................ 726/21 |
| 2011/0162081 | A1 * | 6/2011 | Lopez et al. | .................... 726/26 |
| 2011/0292913 | A1 * | 12/2011 | Wu | ................................ 370/331 |
| 2012/0144189 | A1 * | 6/2012 | Zhong | .......................... 713/155 |
| 2013/0166763 | A1 * | 6/2013 | Forsback | ...................... 709/228 |

\* cited by examiner

*Primary Examiner* — Josnel Jeudy
(74) *Attorney, Agent, or Firm* — Muncy, Geissler, Olds & Lowe, P.C.

(57) ABSTRACT

An authentication and authorization method and system are provided. The method includes: receiving an authentication request transmitted from a first device; transmitting the authentication request to an authentication and authorization server subsystem; authenticating the authentication request and generating authentication information; generating an authorization request used to request a second device for authorization according to the authentication information; and authenticating the authorization request, generating an authorization information and transmitting the authorization information to the first device through an authentication and authorization client subsystem so that the first device communicates with the second device directly according to the authorization information.

18 Claims, 10 Drawing Sheets

AUTHENTICATION AND AUTHORIZATION METHOD AND SYSTEM

CROSS REFERENCE TO RELATED APPLICATIONS

This application claims priority of Taiwan Patent Application No. 102104151, filed on Feb. 4, 2013, the entirety of which is incorporated by reference herein.

BACKGROUND OF THE INVENTION

1. Field of the Invention

The present invention relates to an authentication and authorization method and system, and in particular to an authentication and authorization method and system which can used among applications, components and services.

2. Description of the Related Art

Today, networked environments have become more complicated, and a method of building secure network applications has become an essential factor in all areas of network applications. For example, network device management, communications security between devices, and intelligent terminals access to the applications and services of the system via the network by using an authorization process. The network application is typically composed of multiple components, therefore the mutual authentication and secure communications between these separated components have become indispensable requirements.

However, few independent secure components can be flexibly deployed in different network applications and separated components currently to achieve mutual authentication, authorization and secure communications between different system applications, network devices and distributed network service platforms.

Therefore, an authentication and authorization method and system which may achieve mutual authentication, authorization and secure communications between different system applications, network devices and distributed network service platforms would need to be developed.

BRIEF SUMMARY OF THE INVENTION

A detailed description is given in the following embodiments with reference to the accompanying drawings.

Authentication and authorization methods and systems are provided.

In one exemplary embodiment, the disclosure is directed to an authentication and authorization method, wherein the method is used in an authentication and authorization system. The method comprises following steps: receiving, by an application programming interface (API) of a client, an authentication request transmitted from a first device; transmitting, by an authentication and authorization client subsystem, the authentication request to an authentication and authorization server subsystem; authenticating, by the authentication and authorization server subsystem, the authentication request and generating authentication information; generating, by the authentication and authorization client subsystem, an authorization request used to request a second device for authorization according to the authentication information; and authenticating, by the authentication and authorization server subsystem, the authorization request, generating an authorization information and transmitting the authorization information to the first device through the authentication and authorization client subsystem so that the first device communicates with the second device directly according to the authorization information.

In one exemplary embodiment, the disclosure is directed to an authentication and authorization system. The authentication and authorization system comprises a client and a server. The client comprises an application programming interface (API) and an authentication and authorization client subsystem. The API is configured to receive an authentication request transmitted from a first device. The authentication and authorization client subsystem is coupled to the API and configured to transmit the authentication request. The server is coupled to the client and receiving the authentication request. The authentication and authorization server subsystem is configured to authenticate the authentication request and generate authentication information, wherein the authentication and authorization client subsystem generates an authorization request used to request a second device for authorization according to the authentication information; and the authentication and authorization server subsystem authenticates the authorization request, generates an authorization information and transmits the authorization information to the first device through the authentication and authorization client subsystem so that the first device communicates with the second device directly according to the authorization information.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
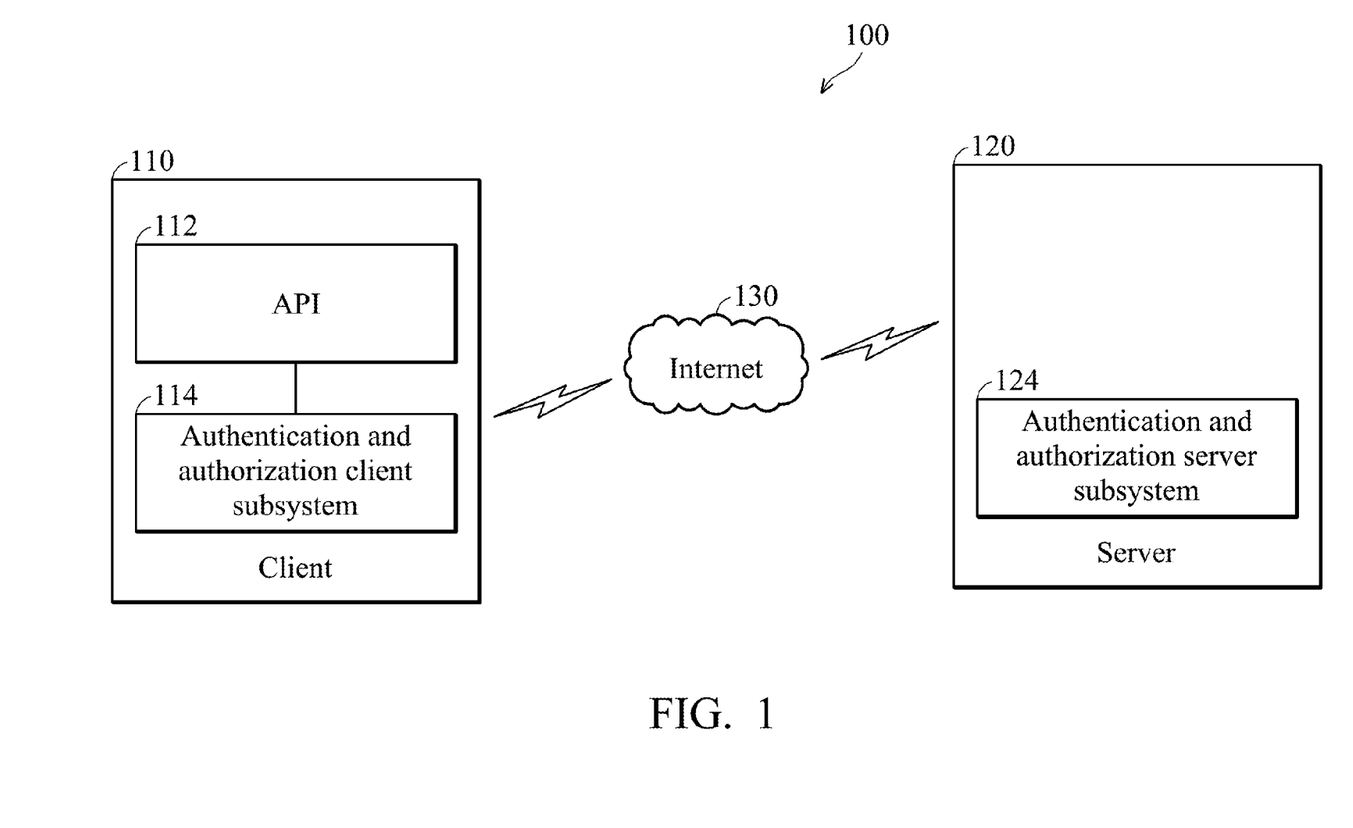
FIG. 1 is a schematic diagram of an authentication and authorization device according to a first embodiment of the present invention.

FIG. 1 is a schematic diagram of an authentication and authorization device 100 according to a first embodiment of the present invention. The authentication and authorization device 100 comprises a client 110 and a server 120. The client 110 and the server 120 may connect to a master-slave network (e.g., Internet), and be connected with each other by Internet 130. The client 110 comprises an application programming interface (API) 112 and an authentication and authorization client subsystem 114, wherein the API 112 is coupled to the authentication and authorization client subsystem 114. The server 120 provides authentication and authorization functions, and comprises an authentication and authorization server subsystem 124.

The API 112 is configured to receive an authentication request transmitted from a first device (not shown in FIG. 1), and transmit to the authentication request to the authentication and authorization client subsystem 114. After receiving the authentication request, the authentication and authorization client subsystem 114 transmits the authentication request to the server 120. The authentication request comprises a user name or an identifier and a random number, wherein the random number is encoded by using a key shared by the first device and the server 120.

After receiving the authentication request, the authentication and authorization server subsystem 124 generates authentication information, and transmits back to the authentication and authorization client subsystem 114, wherein the authentication information comprises a secret and a certificate. The authentication and authorization client subsystem 114 protects the authorization request used to request a second device (not shown in FIG. 1) for the authorization, and transmits the authorization request to the authentication and authorization server subsystem 124.

The authentication and authorization server subsystem 124 authenticates the authorization request. After authenticating the authorization request, the authentication and authorization server subsystem 124 generates an authorization information and transmits the authorization information to the authentication and authorization client subsystem 114, wherein the authorization information comprises a secret shared with the first device and the second device and an authorization certificate authorized by the first device. The authentication and authorization client subsystem 114 transmits the authorization information to the first device through the API 112 so that the first device may communicate with the second device directly according to the authorization information.

It should be noted that, in the first embodiment, the first device may be an application, and the second device may be a service. In another embodiment, the first device and second device may belong to a component.

Figure 2:
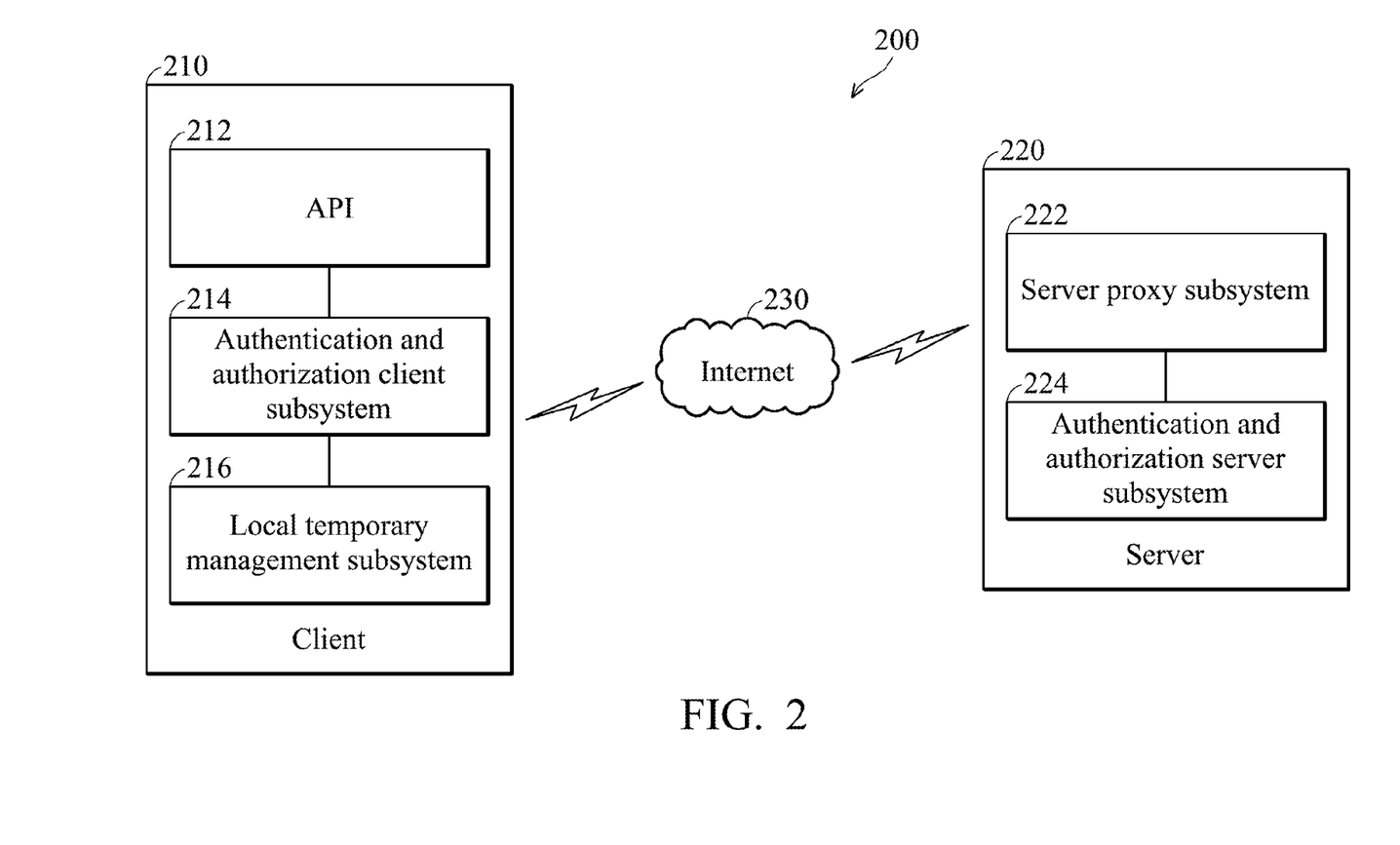
FIG. 2 is a schematic diagram of an authentication and authorization device according to a second embodiment of the present invention.

FIG. 2 is a schematic diagram of an authentication and authorization device 200 according to a second embodiment of the present invention. The authentication and authorization device 200 comprises a client 210 and a server 220. The client 210 and the server 220 may connect to a master-slave network (e.g., Internet), and be connected with each other by Internet 230. The client 210 comprises an application programming interface (API) 212, an authentication and authorization client subsystem 214 and a local temporary management subsystem 216, wherein the authentication and authorization client subsystem 214 is coupled to the API 212 and the local temporary management subsystem 216. The server 220 comprises a server proxy subsystem 222 and an authentication and authorization server subsystem 224, wherein the server proxy subsystem 222 is coupled to the authentication and authorization server subsystem 224. The components with the same name in the first embodiment are the same as the illustration of the first embodiment described above, so the details related to the components of the system will be omitted. The main difference between FIG. 2 and FIG. 1 is that the client 210 further includes the local temporary management subsystem 216, and the server 220 further comprises the server proxy subsystem 222.

In the second embodiment, the local temporary management subsystem 216 is used to store the authentication information when the authentication and authorization client subsystem 214 receives the authentication information transmitted from the authentication and authorization server subsystem 224. In the second embodiment, the system 200 may comprise a plurality of authentication and authorization server subsystems 224. When any authentication and authorization server subsystem 224 is started, the authentication and authorization server subsystem 224 may transmit a registration message to the server proxy subsystem 222 to request for a registration. On the contrary, when any authentication and authorization server subsystem 224 is stopped, the authentication and authorization server subsystem 224 may transmit a cancellation message to the server proxy subsystem. 222 to cancel the registration. The server proxy subsystem 222 stores information of the authentication and authorization server subsystem 224, and finds an authentication and authorization server subsystem corresponding to the authentication and authorization client subsystem 214 from the plurality of authentication and authorization server subsystem 224 according to the information of the authentication and authorization server subsystem 224.

In a particular embodiment, when the first device transmits an authentication request to the client 210, the authentication and authorization client subsystem 214 may determine whether the local temporary management subsystem 216 stores the authentication information. When determining that the local temporary storage management subsystem 216 stores the authentication information and the authentication information is available, the authentication and authorization client subsystem 214 transmits the authentication information to the first device and does not trigger a process that the client 210 requests the server 220 for the authentication. When determining that the local temporary storage management subsystem 216 does not store the authentication information or the authentication information stored in the local temporary storage management subsystem 216 is unavailable, the authentication and authorization client subsystem 214 transmits the authentication request to the authentication and authorization server subsystem 224 to obtain an updated authentication information and store in the local temporary storage management subsystem 216.

In another embodiment, the authentication and authorization client subsystem 214 can detect whether the authentication information stored in the local temporary storage management subsystem 216 has expired or is unavailable.

Figure 3:
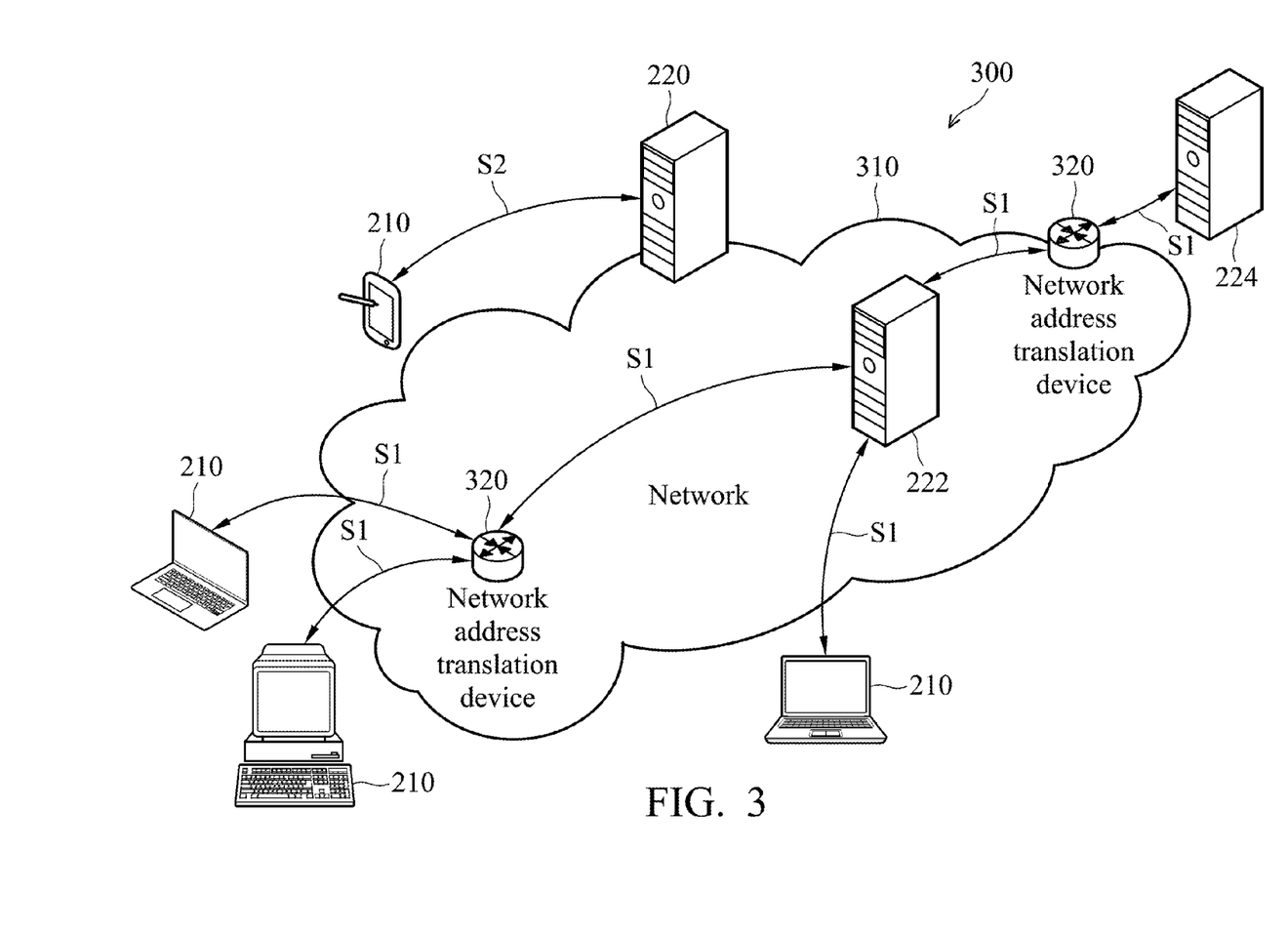
FIG. 3 is a schematic diagram of deploying the system according to an embodiment of the present invention.

In addition, the authentication and authorization system 200 also supports the network environment of the network address translation (NAT), and further can be deployed according to the requirements of the network. FIG. 3 is a schematic diagram 300 of deploying the system according to an embodiment of the present invention with reference to FIG. 2. A device (not shown in FIG. 2), such as, an application/component, may transmit an authentication request to the server 220 to request authentication with another device (not shown in FIG. 2), such as, a component/service, and obtain the authorization information via the client 210. After receiving the authentication request, the server proxy subsystem 222 of the server 220 transmits the authentication request to the authentication and authorization server subsystem 224 corresponding the client 210. The server proxy subsystem 222 is deployed in the network 310, therefore the authentication and authorization server subsystem 224 may forward the authentication request transmitted from the client 210 via the server proxy subsystem 222 when the authentication and authorization server subsystem 224 is located behind the network address translation device 320 (as shown in step S1). In another embodiment, in the case without the server proxy subsystem 222, the authentication and authorization server subsystem 224 can also be deployed in the network 310, and directly receives the authentication request transmitted from the client 210 (as shown in step S2). Therefore, for the client 210, the server proxy subsystem 222 is transparent.

Figure 4:
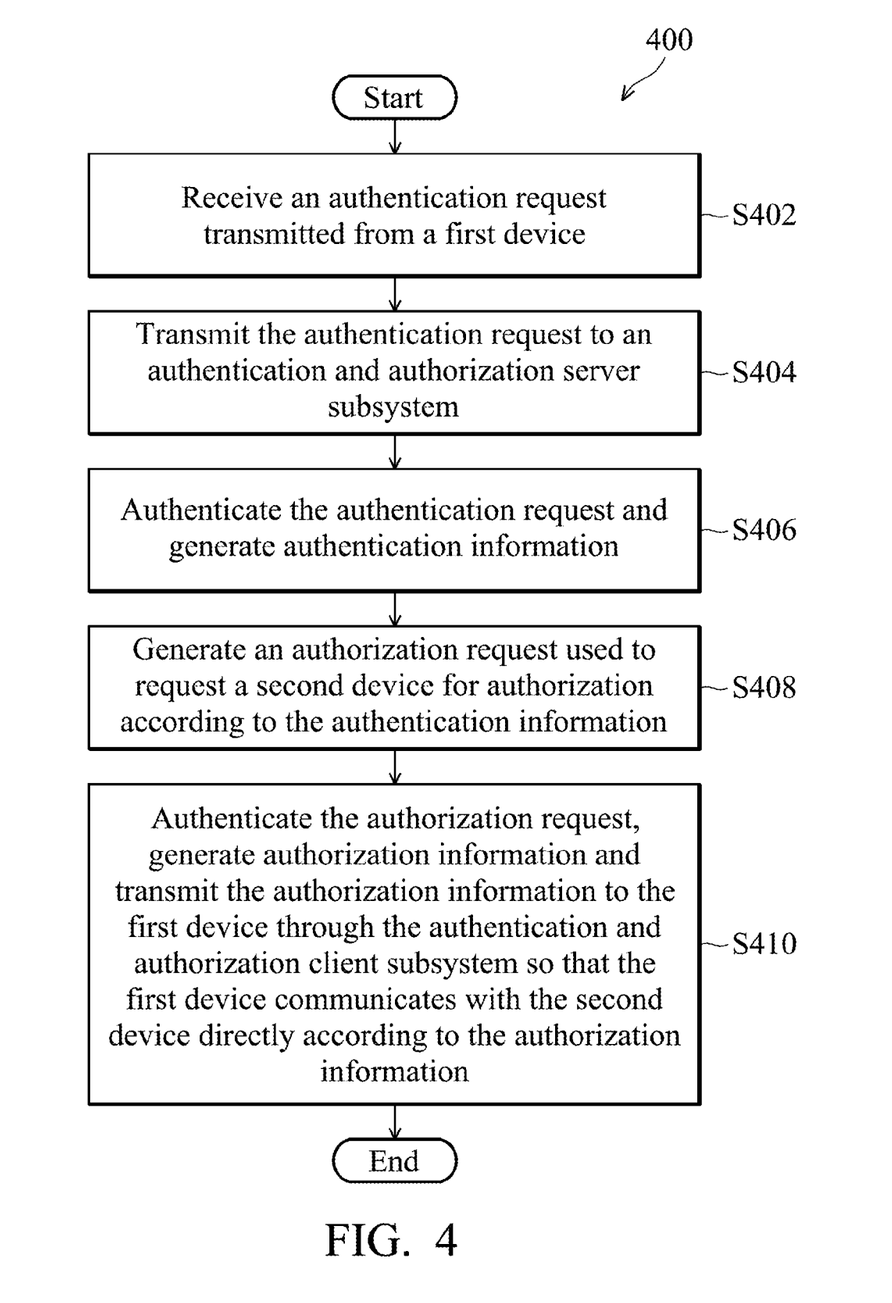
FIG. 4 is a flow diagram illustrating the authentication and authorization method according to the first embodiment of the present invention.

FIG. 4 is a flow diagram 400 illustrating the authentication and authorization method according to the first embodiment of the present invention with reference to FIG. 1. In step S402, an application programming interface (API) of a client receives an authentication request transmitted from a first device. In step S404, an authentication and authorization client subsystem transmits the authentication request to an authentication and authorization server subsystem. In step S406, the authentication and authorization server subsystem authenticates the authentication request and generates authentication information. In step S408, the authentication and authorization client subsystem generates an authorization request used to request a second device for authorization according to the authentication information. In step S410, the authentication and authorization server subsystem authenticates the authorization request, generates an authorization information and transmits the authorization information to the first device through the authentication and authorization client subsystem so that the first device communicates with the second device directly according to the authorization information.

Figure 5:
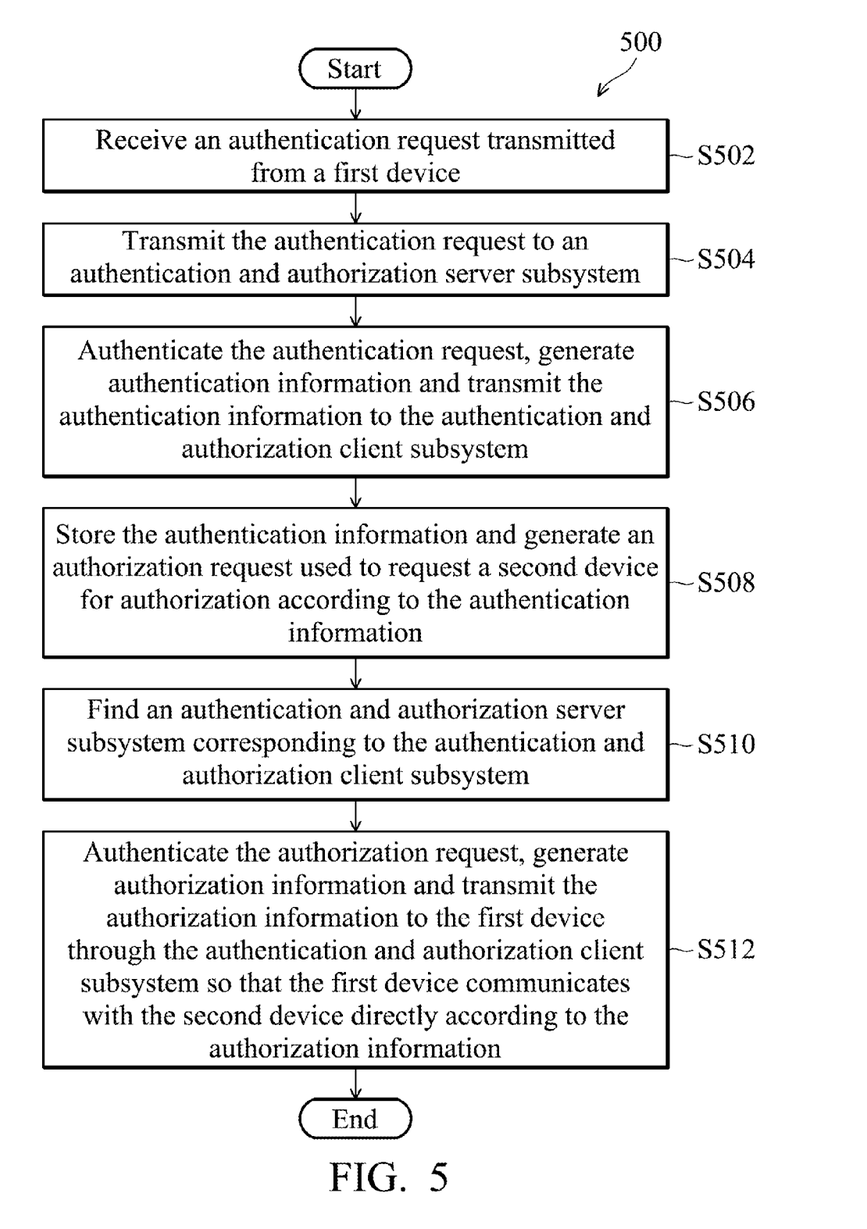
FIG. 5 is a flow diagram illustrating the authentication and authorization method according to the second embodiment of the present invention.

FIG. 5 is a flow diagram 500 illustrating the authentication and authorization method according to the second embodiment of the present invention with reference to FIG. 2. In step S502, an application programming interface (API) of a client receives an authentication request transmitted from a first device. In step S504, an authentication and authorization client subsystem transmits the authentication request to an authentication and authorization server subsystem. In step S506, the authentication and authorization server subsystem authenticates the authentication request, generates authentication information and transmits the authentication information to the authentication and authorization client subsystem. In step S508, a local temporary management subsystem stores the authentication information, and the authentication and authorization client subsystem generates an authorization request used to request a second device for authorization according to the authentication information. In step S510, a server proxy subsystem find an authentication and authorization server subsystem corresponding to the authentication and authorization client subsystem. Finally, in step S512, the authentication and authorization server subsystem authenticates the authorization request, generates an authorization information and transmits the authorization information to the first device through the authentication and authorization client subsystem so that the first device communicates with the second device directly according to the authorization information.

Figure 6:
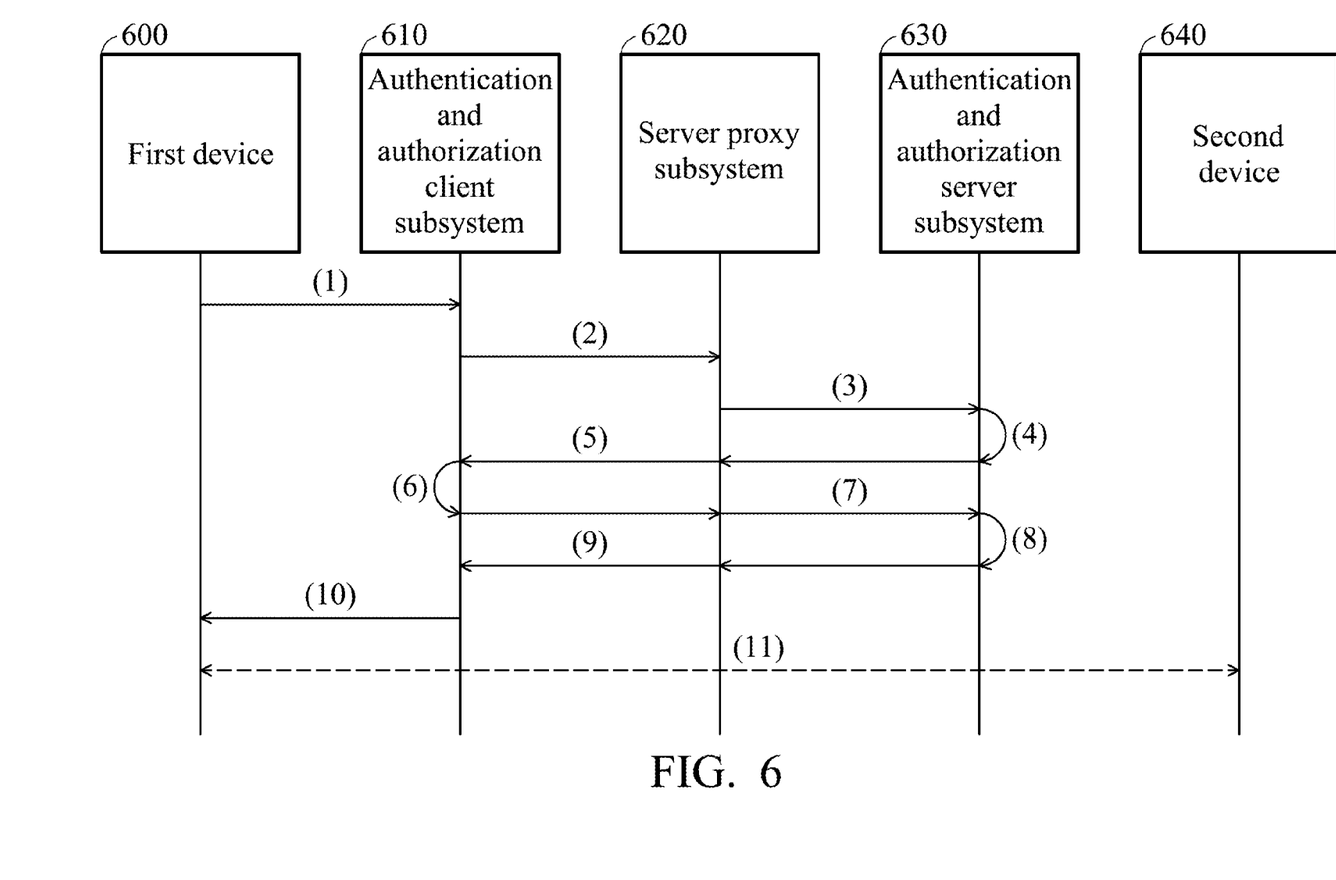
FIG. 6 is a workflow diagram illustrating a workflow of the authentication and authorization system according to an embodiment of the present invention.

FIG. 6 is a workflow diagram illustrating a workflow of the authentication and authorization system according to an embodiment of the present invention.

The authentication and authorization system in the embodiment at least comprises a first device 600, an authentication and authorization client subsystem 610, a server proxy subsystem 620, an authentication and authorization server subsystem 630, and a second device 640. In the embodiment, the server can have a plurality of authentication and authorization server subsystems 630.

The first device 600 transmits an authentication request to the authentication and authorization client subsystem 610 by an application programming interface (API) of a client, as shown in Operation (1). The authentication and authorization client subsystem 610 transmits the authentication request to the server proxy subsystem 620, as shown in Operation (2). The server proxy subsystem 620 transmits the authentication request to an authentication and authorization server subsystems 630 corresponding to the authentication and authorization client subsystem 610, as shown in Operation (3). The authentication and authorization server subsystems 630 authenticates the authentication request and generates authentication information, as shown in Operation (4). The authentication and authorization server subsystems 630 transmits the generated authentication information to the authentication and authorization client subsystem 610 through the server proxy subsystem 620, as shown in Operation (5). The authentication and authorization client subsystem 610 generates an authorization request used to request a second device 640 for the authorization according to the authentication information, as shown in Operation (6). The authentication and authorization client subsystem 610 transmits the generated authorization request to the authentication and authorization server subsystems 630 through the server proxy subsystem 620, as shown in Operation (7). The authentication and authorization server subsystems 630 authenticates the authorization request and generates an authorization information, as shown in Operation (8). The authentication and authorization server subsystems 630 transmits the generated authorization information to the authentication and authorization client subsystem 610 through the server proxy subsystem 620 as shown in Operation (9). The authentication and authorization client subsystem 610 transmits the authorization information to the first device 600 through the API and finishes the workflow, as shown in Operation (10). Finally, the first device 600 can use the authorization information to communicate with the second device 640 directly, as shown in Operation (11).

Figure 7A:
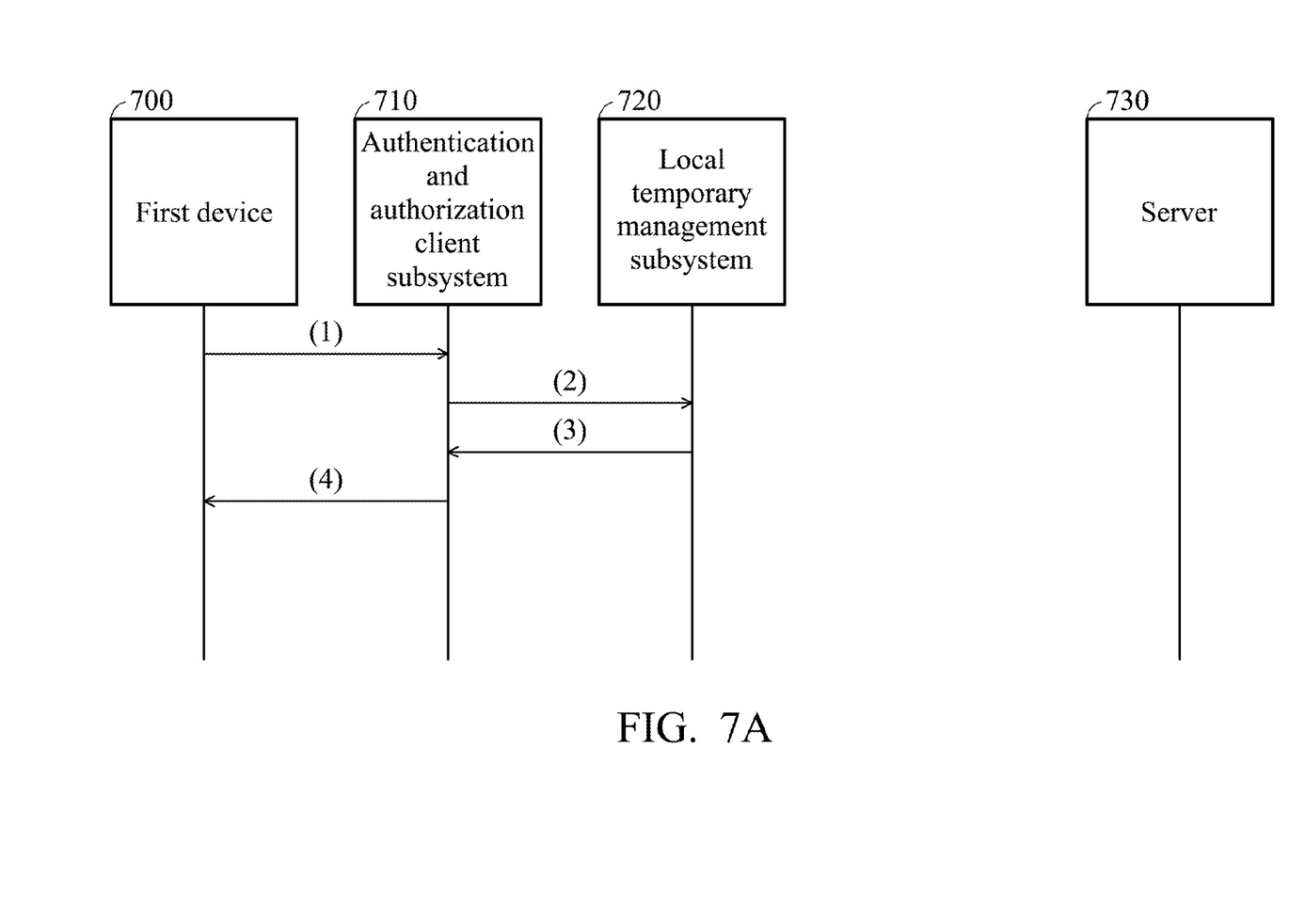
FIGS. 7A~7B are workflow diagrams illustrating how a client obtains the authentication information through the local temporary management subsystem according to an embodiment of the present invention.
Figure 7B:
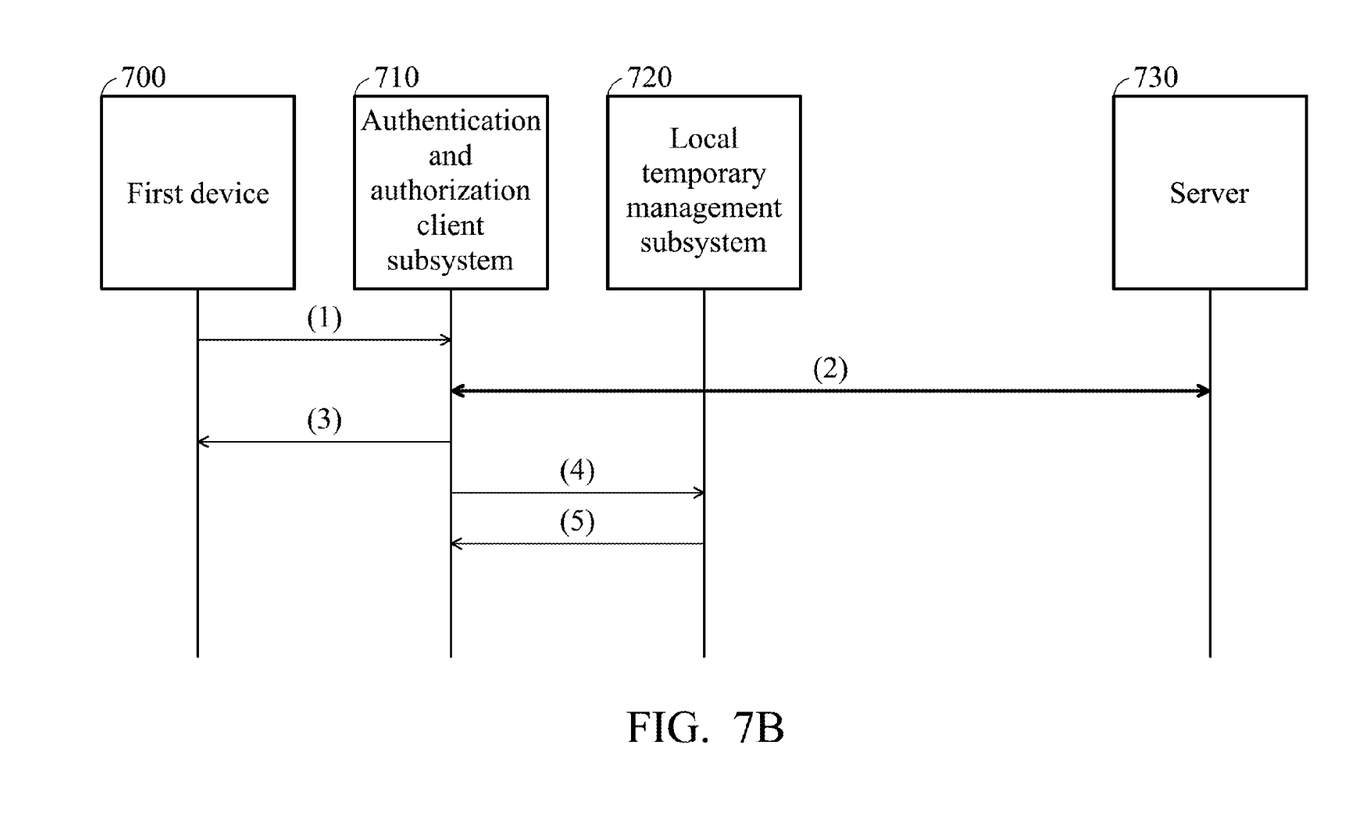

FIGS. 7A~7B are workflow diagrams illustrating how a client obtains the authentication information through the local temporary management subsystem according to an embodiment of the present invention.

The authentication and authorization system in the embodiment at least comprises a first device 700, an authentication and authorization client subsystem 710, a local temporary management subsystem 720 and a server 730.

In FIG. 7A, the first device 700 transmits an authentication request to the authentication and authorization client subsystem 710 by an application programming interface (API) of a client, as shown in Operation (1). The authentication and authorization client subsystem 710 requests the authentication information obtained by the authentication and authorization server subsystem from the local temporary management subsystem 720, as shown in Operation (2). The local temporary management subsystem 720 transmits the authentication information to the authentication and authorization client subsystem 710, as shown in Operation (3). The authentication and authorization client subsystem 710 transmits the authentication information to the first device 700 through the API and finishes the workflow, as shown in Operation (4).

In the embodiment of FIG. 7A, the local temporary management subsystem 720 has stored the authentication information that the authentication and authorization client subsystem 710 obtains from the authentication and authorization server subsystem. When the local temporary management subsystem 720 does not store the authentication information or the stored authentication information is unavailable, the workflow of FIG. 7B is executed.

In FIG. 7B, the first device 700 transmits an authentication request to the authentication and authorization client subsystem 710 by an application programming interface (API) of a client, as shown in Operation (1). However, when the local temporary management subsystem 720 does not store the authentication information or the stored authentication information is unavailable, the authentication and authorization client subsystem 710 re-executes the authentication and authorization method to request the server 730 re-authenticates and re-authorizes the authentication request to obtain the authorization information, as shown in Operation (2). The authentication and authorization client subsystem 710 transmits the authorization information to the first device 700 by the API, as shown in Operation (3). In addition, the authentication and authorization client subsystem 710 further transmits an updated request to the local temporary management subsystem 720 to request to update the authentication and authorization information, as shown in Operation (4). Finally, the local temporary management subsystem 720 transmits an updated response to the authentication and authorization client subsystem 710 to indicate the updated process is finished, as shown in Operation (5).

Figure 8A:
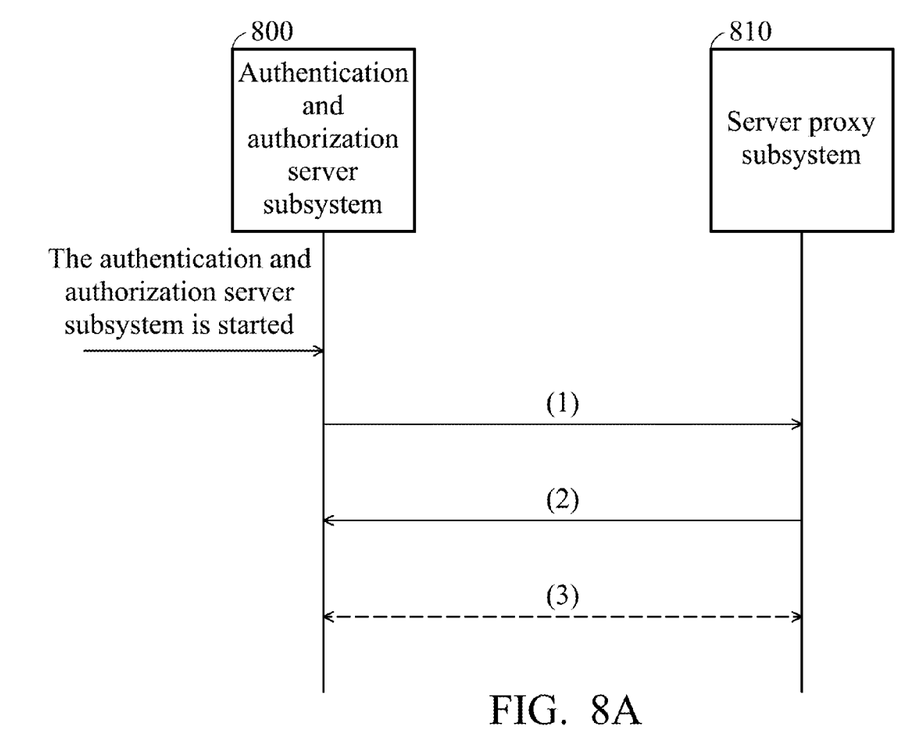
FIGS. 8A~8B are workflow diagrams illustrating the authentication and authorization server subsystem requests the server proxy subsystem for a registration and requests to cancel the registration according to an embodiment of the present invention.
Figure 8B:
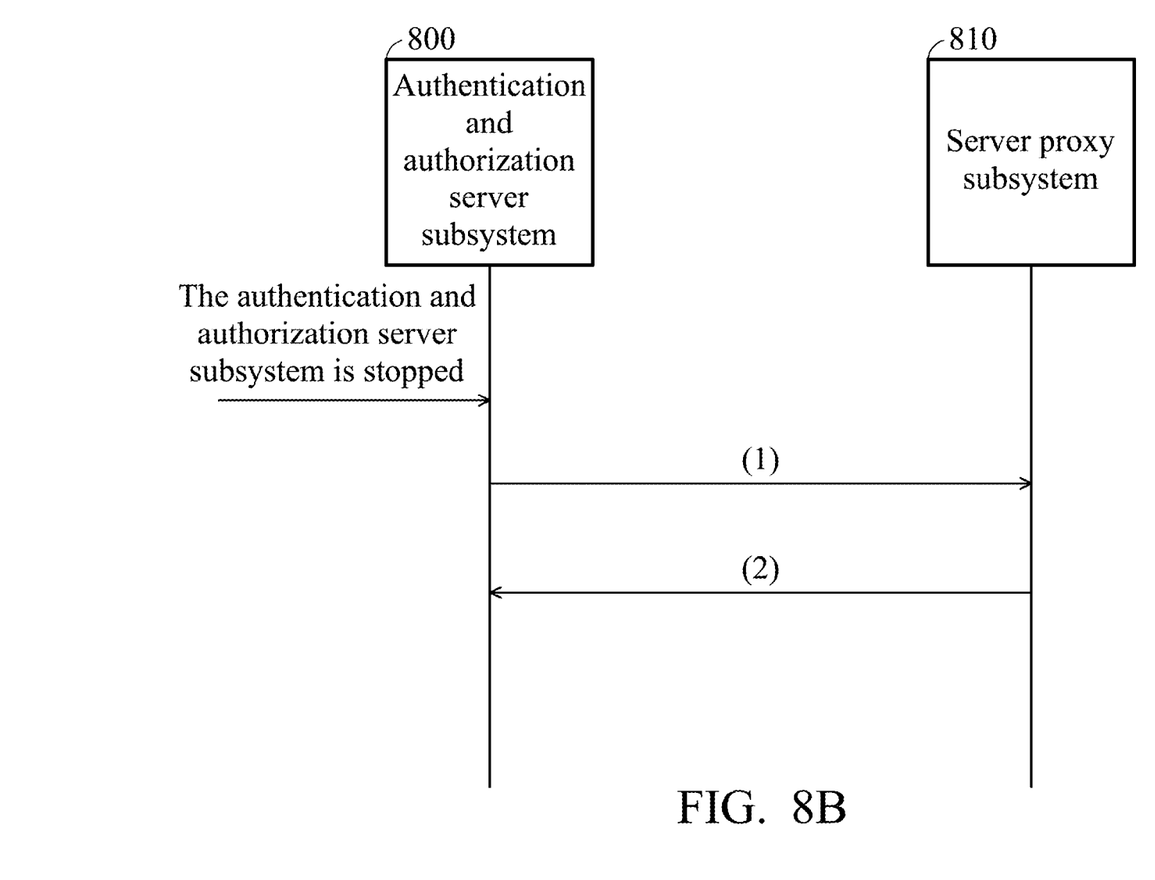

FIGS. 8A~8B are workflow diagrams illustrating the authentication and authorization server subsystem requests the server proxy subsystem for a registration and requests to cancel the registration according to an embodiment of the present invention. The server in the embodiment of the invention at least comprises an authentication and authorization server subsystem 800 and a server proxy subsystem 810.

In FIG. 8A, when the authentication and authorization server subsystem 800 is started, the authentication and authorization server subsystem 800 transmits a registration message to the server proxy subsystem 810 to request for a registration, as shown in Operation (1). After receiving the registration message, the server proxy subsystem 810 transmits a registration response to the authentication and authorization server subsystem 800 to indicate the registration is completed, as shown in Operation (2). When the registration has expired, the authentication and authorization server subsystem 800 may re-register to the server proxy subsystem 810, as shown in Operation (3).

Similarly, in FIG. 8B, when the authentication and authorization server subsystem 800 is stopped, the authentication and authorization server subsystem 800 may transmit a cancellation message to the server proxy subsystem 810 to cancel the registration, as shown in Operation (1). After receiving the cancellation message, the server proxy subsystem 810 transmits a cancellation response to the authentication and authorization server subsystem 800 to indicate the registration has been cancelled, as shown in Operation (2).

The authentication and authorization system in the invention may be used as a component and an application, be configured in other network components and applications, and may be used as an independent system to provide mutual authentication, authorization and secure communications between different system applications, network devices and distributed network service platforms.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An authentication and authorization method, wherein the method is used in an authentication and authorization system, comprising:
   receiving, by an application programming interface (API) of a client, an authentication request transmitted from a first device;
   transmitting, by an authentication and authorization client subsystem, the authentication request to an authentication and authorization server subsystem;
   authenticating, by the authentication and authorization server subsystem, the authentication request, generating authentication information and storing the authentication information in a local temporary management subsystem;
   generating, by the authentication and authorization client subsystem, an authorization request used to request a second device for authorization according to the authentication information;
   authenticating, by the authentication and authorization server subsystem, the authorization request, generating an authorization information and transmitting the authorization information to the first device through the authentication and authorization client subsystem so that the first device communicates with the second device directly according to the authorization information;
   determining, by the authentication and authorization client subsystem, whether the local temporary management subsystem has the authentication information when the first device transmits the authentication request to the client;
   transmitting, by the authentication and authorization client subsystem, the authentication information to the first device when determining that the local temporary storage management subsystem stores the authentication information and the authentication information is available; and
   transmitting, by the authentication and authorization client subsystem, the authentication request to the authentication and authorization server subsystem to obtain an updated authentication information when determining that the local temporary storage management subsystem does not store the authentication information or the authentication information is unavailable.

2. The authentication and authorization method as claimed in claim 1, wherein the authentication request comprises a user name or an identifier and a random number that the server uses to identify the first device, wherein the random number is encoded by using a key shared by the first device and the server.

3. The authentication and authorization method as claimed in claim 1, wherein the authentication information comprises a secret and a certificate, wherein the secret is used to protect the authorization request.

4. The authentication and authorization method as claimed in claim 1, wherein the authorization information comprises a secret shared with the first device and the second device and an authorization certificate authorized by the first device.

5. The authentication and authorization method as claimed in claim 1, further comprising the following steps:

when the server has a plurality of authentication and authorization server subsystems, a server proxy subsystem finds an authentication and authorization subsystem of the server corresponding to the authentication and authorization client subsystem.

6. The authentication and authorization method as claimed in claim 5, further comprising the following steps:
transmitting, by the authentication and authorization server subsystem, a registration message to request for a registration when the authentication and authorization server subsystem is started; and
transmitting, by the authentication and authorization server subsystem, a cancellation message to cancel the registration when the authentication and authorization server subsystem is stopped.

7. The authentication and authorization method as claimed in claim 1, wherein the first device is an application, and the second device is a service.

8. The authentication and authorization method as claimed in claim 1, wherein the first device and the second device are components.

9. The authentication and authorization method as claimed in claim 1, wherein the authentication and authorization system is used in a network environment of a network address translation (NAT).

10. An authentication and authorization system, comprising:
a client, comprising:
an application programming interface (API) receiving an authentication request transmitted from a first device;
an authentication and authorization client subsystem transmitting the authentication request; and
a local temporary management subsystem, storing the authentication information; and
a server, coupled to the client and receiving the authentication request, comprising:
an authentication and authorization server subsystem authenticating the authentication request and generate authentication information,
wherein the authentication and authorization client subsystem generates an authorization request used to request a second device for authorization according to the authentication information, wherein the authentication and authorization server subsystem authenticates the authorization request, generates an authorization information and transmits the authorization information to the first device through the authentication and authorization client subsystem so that the first device communicates with the second device directly according to the authorization information, wherein when the first device transmits the authentication request to the client, the authentication and authorization client subsystem determines whether the local temporary management subsystem stores the authentication information, and wherein when determining that the local temporary storage management subsystem stores the authentication information and the authentication information is available, the authentication and authorization client subsystem transmits the authentication information to the first device, and when determining that the local temporary storage management subsystem does not store the authentication information or the authentication information is unavailable, the authentication and authorization client subsystem transmits the authentication request to the authentication and authorization server subsystem to obtain an updated authentication information.

11. The authentication and authorization system as claimed in claim 10, wherein the authentication request comprises a user name or an identifier and a random number that the server uses to identify the first device, wherein the random number is encoded by using a key shared by the first device and the server.

12. The authentication and authorization system as claimed in claim 10, wherein the authentication information comprises a secret and a certificate, wherein the secret is used to protect the authorization request.

13. The authentication and authorization system as claimed in claim 10, wherein the authorization information comprises a secret shared with the first device and the second device and an authorization certificate authorized by the first device.

14. The authentication and authorization system as claimed in claim 10, wherein the server further comprises:
a plurality of authentication and authorization server subsystems; and
a server proxy subsystem, coupled to the authentication and authorization server subsystems and finding an authentication and authorization server subsystem corresponding to the authentication and authorization client subsystem.

15. The authentication and authorization system as claimed in claim 14, wherein:
when the authentication and authorization server subsystem is started, the authentication and authorization server subsystem transmits a registration message to the server proxy subsystem to request for a registration; and
when the authentication and authorization server subsystem is stopped, the authentication and authorization server subsystem transmits a cancellation message to the server proxy subsystem to cancel the registration.

16. The authentication and authorization system as claimed in claim 10, wherein the first device is an application, and the second device is a service.

17. The authentication and authorization system as claimed in claim 10, wherein the first device and the second device are components.

18. The authentication and authorization system as claimed in claim 10, wherein the authentication and authorization system is used in a network environment of a network address translation (NAT).

* * * * *